United States Patent

Unterseh

[11] Patent Number: 5,773,724
[45] Date of Patent: Jun. 30, 1998

[54] METHOD OF MANUFACTURING SADDLE COILS HAVING DIFFERENT DIMENSIONS

[75] Inventor: Roland Unterseh, Saint Louis, France

[73] Assignee: Endress + Hauser Flowtec AG, Reinach, Switzerland

[21] Appl. No.: 621,832

[22] Filed: Mar. 22, 1996

[30] Foreign Application Priority Data

Oct. 13, 1995 [EP] European Pat. Off. ......... 95 11 6189.2

[51] Int. Cl.$^6$ ........................................................ G01F 1/58
[52] U.S. Cl. ............................................ 73/861.12; 29/605
[58] Field of Search ........................ 29/605; 73/861.12, 73/861.14, 861.15, 861.16, 861.17

[56] References Cited

U.S. PATENT DOCUMENTS

| | | |
|---|---|---|
| 1,965,330 | 7/1934 | Apple . |
| 3,676,814 | 7/1972 | Trunzo et al. .............................. 29/605 |
| 4,124,419 | 11/1978 | Keske ........................................ 29/605 |
| 4,231,151 | 11/1980 | Handerer et al. ......................... 29/605 |
| 4,614,121 | 9/1986 | Hansen et al. ........................ 73/861.12 |
| 4,819,323 | 4/1989 | Groothoff .................................. 29/605 |
| 5,125,276 | 6/1992 | Wada ................................... 73/861.12 |

FOREIGN PATENT DOCUMENTS 566 303 A1   10/1993   European Pat. Off. .

*Primary Examiner*—Ronald L. Biegel
*Attorney, Agent, or Firm*—Bose McKinney & Evans

[57] ABSTRACT

For the low-cost manufacture of differently dimensioned saddle coils (2) which have good long-term dimensional stability, although because of the thickness of the wire used for the saddle coil, the dimensional stability cannot be achieved with this wire alone, and which fit differently curved surfaces and have a number of turns, use is made of a prefabricated wire having a first insulating-varnish coating directly thereon and a second insulating-varnish coating applied to the first coating, the second coating having a baking temperature lower than the softening point of the first coating. The coil is wound on a coil form (1) to form a flat coil (21), the coil form being a prefabricated part of a flexible plastic which is dimensionally stable at the baking temperature. The flat coil is then fitted, together with the coil form (1), to the curved surface of a corresponding dummy to form a still dimensionally unstable saddle coil. Then, a current whose strength is so chosen that the baking temperature is at least reached is sent through the saddle coil until the second insulating-varnish coatings are bonded, baked, or fused at least to each other. After the current has been switched off, the second insulating-varnish coating is allowed to solidify, and the now dimensionally stable saddle coil (2), together with the coil form (1), can be used for the intended purpose.

4 Claims, 1 Drawing Sheet

METHOD OF MANUFACTURING SADDLE COILS HAVING DIFFERENT DIMENSIONS

FIELD OF THE INVENTION

The present invention relates to a method of manufacturing differently dimensioned saddle coils which each fit one of differently dimensioned curved surfaces and which have a number of turns.

BACKGROUND OF THE INVENTION

Such saddle coils serve, for example, to produce a magnetic field in electromagnetic flow sensors. As is well known, electromagnetic flow meters make it possible to measure the volumentric flow rate of an electrically conductive liquid flowing in a measuring tube. The part of the measuring tube which comes in contact with the liquid is electrically nonconducting so that a voltage induced by the magnetic field according to Faraday's law of induction would not be short-circuited if the measuring tube were completely made of metal, i.e., if the liquid came in contact with the metal. The magnetic field generally cuts the measuring tube perpendicular to the longitudinal axis of the tube.

In electromagnetic flow sensors, the aforementioned curved surface is a portion of the surface of the practically invariably circular cylindrical measuring tube, to whose curvature the saddle coil is adapted as closely as possible, i.e., its turns extend parallel to the surface in sections, as will be explained in more detail below.

EP-A-566 303 discloses a method of manufacturing a deflection coil fitting the neck and the adjoining spherical-cup-shaped portion of a television picture tube, i.e., a deflection coil which fits the curved surface of these portions of the television picture tube and has a number of turns, wherein a prefabricated wire with a single coating of a first insulating varnish is used for the deflection coil
from which a flat wire band having several parallel lengths of wire is formed by jointly coating the latter with a liquid second insulating varnish which solidifies after the coating,
said second insulating varnish being liquifiable again by being heated to a temperature lower than the softening point of the first insulating varnish;
the wire band is wound onto and in grooves of a prefabricated bobbin already having the final three-dimensional shape adapted to the shape of the portions of the television picture tube;
said bobbin having a tubular portion to be slipped over the neck of the television picture tube;
a current of such a strength that the softening point is reached is sent through the deflection coil
until the second insulating varnish bonds, and particularly bakes, the turns at least to one another; and
after the current has been switched off, the second insulating varnish is allowed to solidify.

It is obviously a disadvantage of this method that for different picture-tube sizes, correspondingly dimensioned, prefabricated bobbins must be used, so that numerous types of bobbins must be kept in stock. Therefore, it is not possible to assign several picture-tube sizes to a single type of bobbin.

U.S. Pat. 1,965,330 discloses a method of manufacturing a flat air-core coil having a number of turns wherein a prefabricated wire with a covering of fabric is used,
said fabric being impregnated with an insulating varnish which can be softened again by being heated;
the wire is wound into a flat coil in a preliminary form;
form and coil are heated to a temperature at which the insulating varnish softens enough to cause the individual turns of the coil to bake together;
the insulating varnish is allowed to solidify again; and
the coil is removed from the form as a finished air-core coil.

SUMMARY OF THE INVENTION

It is an object of the invention to provide a low-cost method of manufacturing saddle coils which have good long-term dimensional stability, although because of the thickness of the wire used for the saddle coils, the dimensional stability cannot be achieved with this wire alone in the wound condition.

It is another object of the invention to make it possible to manufacture saddle coils for several, differently dimensioned curved surfaces with a single type of coil form.

To attain these objects, the invention provides a method of manufacturing differently dimensioned saddle coils which each fit one of differently dimensioned curved surfaces and which have a number of turns, wherein a prefabricated wire is used for the saddle coil,
said wire having a first insulating-varnish coating directly thereon and a second insulating-varnish coating applied to the first insulating-varnish coating, said second insulating-varnish coating having a baking temperature lower than the softening point of the first insulating-varnish coating;
the wire is first wound into a flat coil on a coil form which was prefabricated from a flexible plastic which is dimensionally stable with respect to the individual parts of the coil form at the baking temperature;
the flat coil, together with the coil form, is fitted to the curved surface or a corresponding dummy to form a still dimensionally unstable saddle coil,
through the latter, a current of such a strength that the baking temperature is at least reached is sent
until the second insulating-varnish coatings of the turns are bonded, particularly baked or fused, at least to each other;
after the current has been switched off, the second insulating-varnish coating is allowed to solidify; and
the now dimensionally stable saddle coil, together with the coil form, is put to an intended use.

In one preferred embodiment of the invention, the curved surface is a portion of the surface of a circular cylinder.

In another preferred embodiment of the invention, the material of the coil form is fluorinated ethylene propylene.

A saddle coil manufactured according to the invention can preferably be used in an electromagnetic flow sensor with a measuring tube to whose surface the saddle coil and the coil form fit.

One advantage of the invention is that, to achieve the stability of the curved shape of the saddle coil, no further means are necessary, such as wrappings with stabilizing layers, e.g., ribbons of fabric, which may have to be impregnated with a curable varnish after the wrapping.

Another advantage is that the coil form makes it possible to maintain safety distances between live parts, i.e., turns of the saddle coil, and grounded parts, i.e., for example, the surface of a metallic measuring tube of an electromagnetic flow sensor, as are prescribed in standards, such as DIN or CENELEC. In the case of the deflection coil mentioned by way of introduction, the considerations underlying this advantage are not necessary, because that coil is supported by the aforementioned portions of a picture tube made of glass.

BRIEF DESCRIPTION OF THE DRAWINGS

The invention will now be explained in more detail with reference to the accompanying drawing showing, inter alia, an embodiment of a saddle coil according to the invention at two different stages of manufacture. Reference characters of similar parts in two or all of the figures have been entered in only one of the figures for the sake of clarity.

DETAILED DESCRIPTION OF THE DRAWINGS

Figure 1:
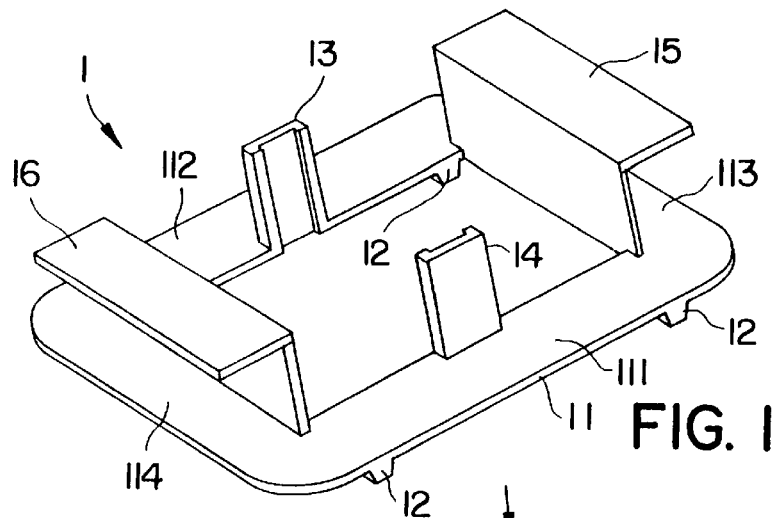
FIG. 1 is a perspective view of a coil form.

FIG. 1 shows one embodiment of a suitable coil form 1 onto which a saddle coil 2 to be manufactured (cf. FIG. 3) is to be wound, and which thus supports the finished saddle coil.

The coil form 1 is prefabricated from a flexible, but dimensionally stable plastic, preferably fluorinated ethylene propylene. The coil form 1 may be regarded as half open.

This follows from the fact that no cover plate is provided parallel to a framelike base plate 11, which is provided with feet 12. In the finished and final mounting condition, the feet are supported by the curved surface which the saddle coil 2 then fits.

To hold the saddle coil 2 in place, only two opposite vertical members 13, 14 and two opposite angular members 14, 15 are provided, the vertical members 13 and 14 extending from a rear frame member 112 and a front frame member 111, respectively, and the angular members 15 and 16 extending from a right-hand frame member 113 and a left-hand frame member 114, respectively.

The individual parts of the coil form 1 contribute to the above-mentioned property of the latter that prescribed safety distances can be maintained. The safetey distance from the curved surface, i.e., from a measuring tube of an electromagnetic flowmeter, for example, is given by the sum of the thickness of the base plate 11 and the height of the feet 12.

If a ferromagnetic core, e.g., in the form of a core lamination, is to be provided in the opening of the saddle coil 2, the vertical members 13, 14 and the angular members 15, 16 also contribute to the maintenance of the safety distance, the angular members 15, 16 particularly with their legs parallel to the base plate 11 in the case of the core lamination, which can then extend beyond the legs.

Furthermore, the above-described construction of the coil form 1 makes it possible to manufacture several saddlecoil types belonging to differently dimensioned curved surfaces with a single, suitably dimensioned type of coil form.

The saddle coil is wound onto the coil form 1 in such a way that the respective planes of the individual turns are parallel to the base plate 11. For a predetermined or intended number of turns, and thus inductance, of the saddle coil, the height of the angular members 15, 16, the height of the vertical members 13, 14, and the width of the frame members 111, 112, 113, 114 will be chosen depending on the outside diameter of the wire to be used.

Figure 2:
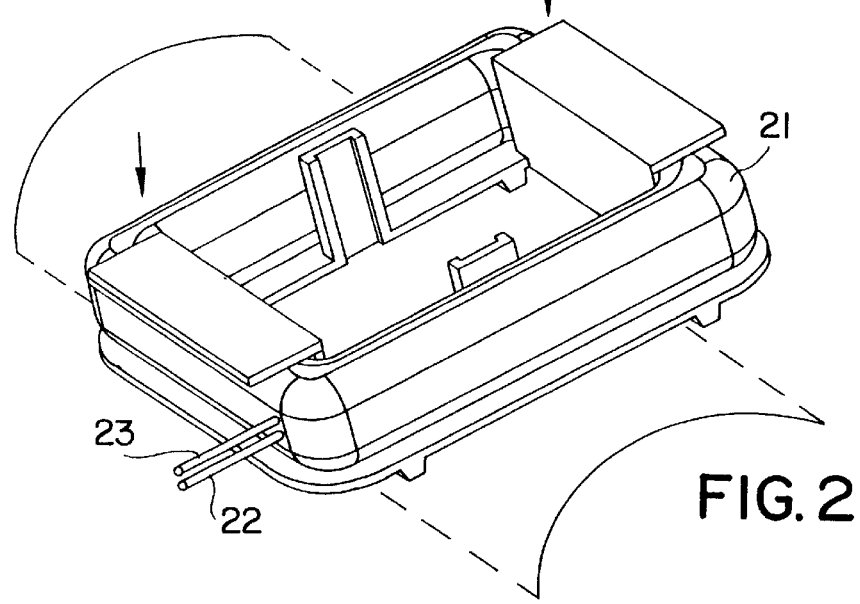
FIG. 2 is a perspective view of a flat coil wound on the coil form.
Figure 3:
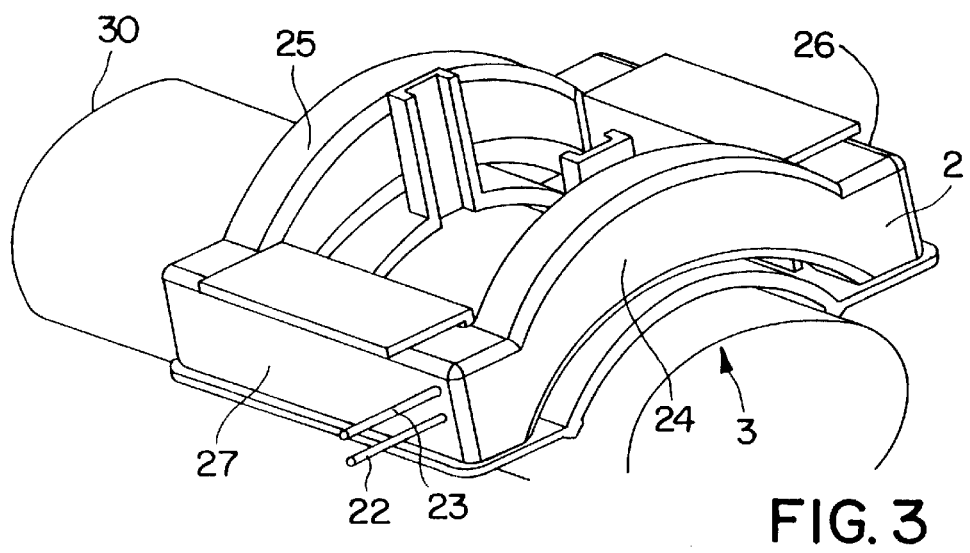
FIG. 3 is a perspective view of a saddle coil in the finished condition.

The resulting available winding space is utilized only to the point that the frame members still project slightly beyond the finished saddle coil, cf. FIGS. 2 and 3, which further contributes to the maintenance of the aforementioned safety distances.

FIG. 2 shows the condition in which all turns have been wound onto the coil form 1 and in which the saddle coil to be manufactured is present in the form of a flat coil 21, the beginning 22 and the end 23 of which have been brought out.

For the saddle coil 2, a specific wire prefabricated by, e.g., a wire supplier must be used which must have a first insulating-varnish coating directly on it and a second insulating-varnish coating applied to the first coating. The second insulating-varnish coating must have a baking temperature which is lower than the softening point of the first insulating-varnish coating. Thus, use must be made of a so-called double enameled wire. The baking temperature of the second insulating-varnish coating is approximately 180° C. to 230° C., for example.

The term "baking temperature" as used herein means that temperature at which the second insulating-varnish coating has already become so soft that the individual varnish portions of adjacent turns flow together, while the first insulating-varnish coating is still hard at the baking temperature, because its softening point is higher than the baking temperature. The aforementioned dimensional stability of the plastic of the coil form 1 also relates at least to the baking temperature, of course.

After the flat coil 21 has been wound, it is fitted, together with the coil form 1, to a curved surface, namely either to the surface to which the saddle coil is to be adapted or to a corresponding dummy, via the feet 12 as shown in FIG. 2. In one embodiment of the invention, the curved surface is a portion of the surface of a circular cylinder, i.e., of the measuring tube 30 of an electromagnetic flow meter, for example as shown in FIG. 3.

The fitting, which took place in FIG. 3 at 3, is achieved by suitably bending the coil form 1 and the flat coil 2 using, if necessary, a suitable tool which presses from the side remote from the feet 12 against the coil form 1 and the flat coil 2 in the direction of the arrows shown in FIG. 2.

In the pressed-on condition, a current is sent through the still dimensionally unstable saddle coil, the strength of the current being so chosen depending on the ohmic resistance of the saddle coil that the baking temperature is at least reached.

The current can be a direct, alternating, or pulsed current. The current is sent through the still dimensionally unstable saddle coil until the second insulating-varnish coatings and the turns of the coil are bonded, particularly baked or fused, at least to each other.

After the current has been switched off, the softened second insulating-varnish coatings of the individual turns are allowed to solidify. The saddle coil 2 is then complete, as shown in FIG. 3.

The saddle coil 2, which is now dimensionally stable, can be further processed together with the coil form 1, i.e., it can preferably be mounted on the measuring tube 30 of an electromagnetic flow sensor.

In that case, the turns of the saddle coil, as already briefly mentioned by way of introduction, extend in sections parallel to the aforementioned portion of the surface of the measuring tube 30. The curved coil portion 24 at the front and the curved coil portion 25 at the rear extend parallel to a respective sector of the circumference of the measuring tube 30, while the noncurved, straight coil portions 26 and 27, extending from the front to the rear at the right and the left, respectively, follow respective straight surface lines of the measuring tube parallel to the axis of the tube 30.

Regarding the embodiment of FIG. 3 it should be noted that the graphical representation of the roundness of the corners of the saddle coil 2 differs from the graphical representation in FIG. 2 because the figures were drawn with a computer drawing system with which curvatures in two mutually perpendicular planes can only be represented in the manner shown. Thus, the corners in FIG. 3 should actually be drawn like those in FIG. 2. However, this minor inaccuracy in FIG. 3 is of no significance for the explanation and understanding of the invention.

It is claimed:

1. A method of manufacturing differently dimensioned saddle coils which each fit one of differently dimensioned curved surfaces and which have a number of turns, wherein a prefabricated wire is used for the saddle coil,
      said wire having a first insulating-varnish coating directly thereon and a second insulating-varnish coating applied to the first insulating-varnish coating, said second insulating-varnish coating having a baking temperature lower than the softening point of the first insulating-varnish coating;
   the wire is first wound into a flat coil on a coil form which was prefabricated from a flexible plastic which is dimensionally stable with respect to the individual parts of the coil form at the baking temperature;
   the flat coil, together with the coil form, is fitted to the curved surface or a corresponding dummy to form a still dimensionally unstable saddle coil,
   through the latter, a current of such a strength that the baking temperature is at least reached is sent
      until the second insulating-varnish coatings of the turns are bonded, particularly baked or fused, at least to each other;
   after the current has been switched off, the second insulating-varnish coating is allowed to solidify; and
   the now dimensionally stable saddle coil, together with the coil form, is put to an intended use.

2. A method as claimed in claim 1 wherein the curved surface is a portion of a surface of a circular cylinder.

3. A method as claimed in claim 1 wherein the coil form is made of fluorinated ethylene propylene.

4. Use of a saddle coil manufactured by the method of claims 1 and 2 in an electromagnetic flow sensor with a measuring tube wherein the saddle coil and the coil form are fitted to a surface portion of measuring tube.

\* \* \* \* \*